April 24, 1956     R. A. DOMINGUEZ     2,742,955
COLLAPSIBLE SEAT STRUCTURE
Filed Jan. 13, 1951     3 Sheets-Sheet 1
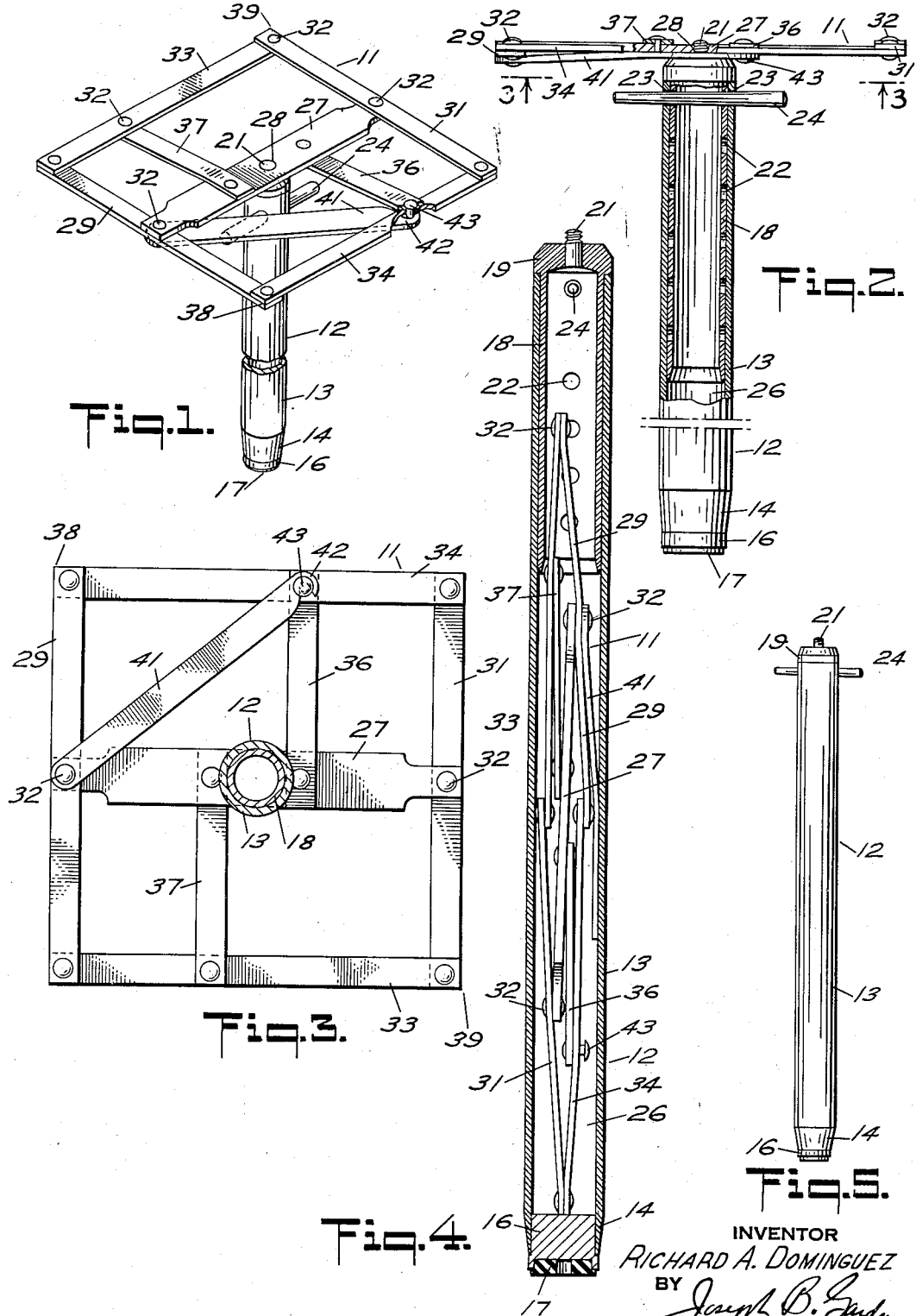
INVENTOR
RICHARD A. DOMINGUEZ
BY
ATTORNEY April 24, 1956

R. A. DOMINGUEZ 2,742,955

COLLAPSIBLE SEAT STRUCTURE

Filed Jan. 13, 1951

INVENTOR
RICHARD A. DOMINGUEZ
BY
*Joseph B. Gardner*
ATTORNEY

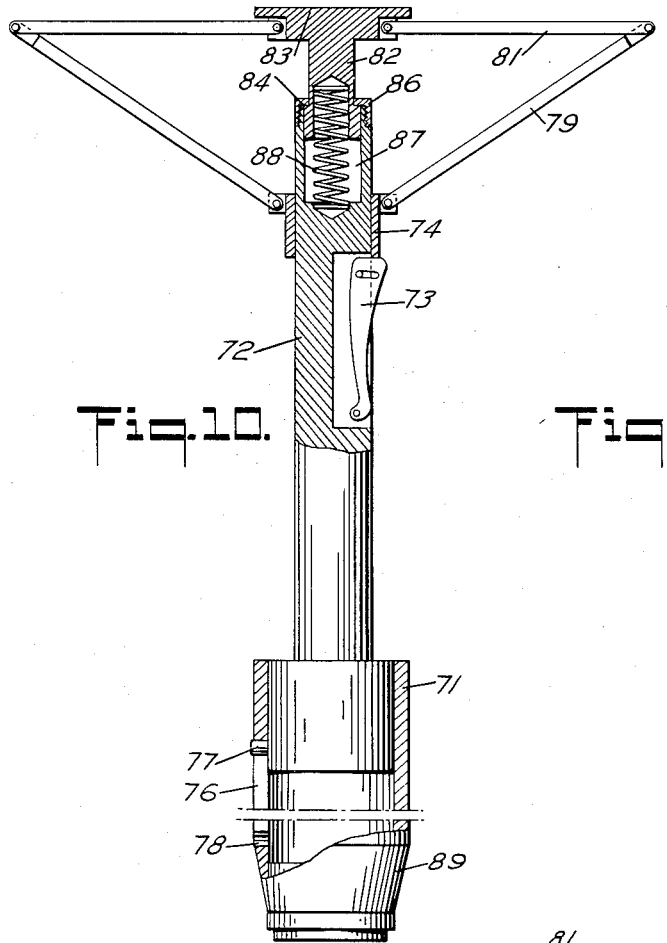
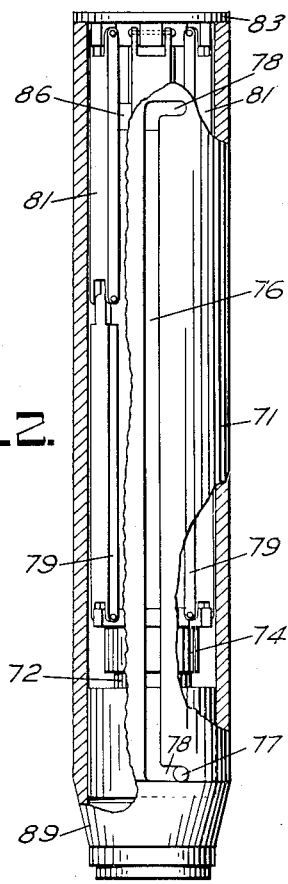
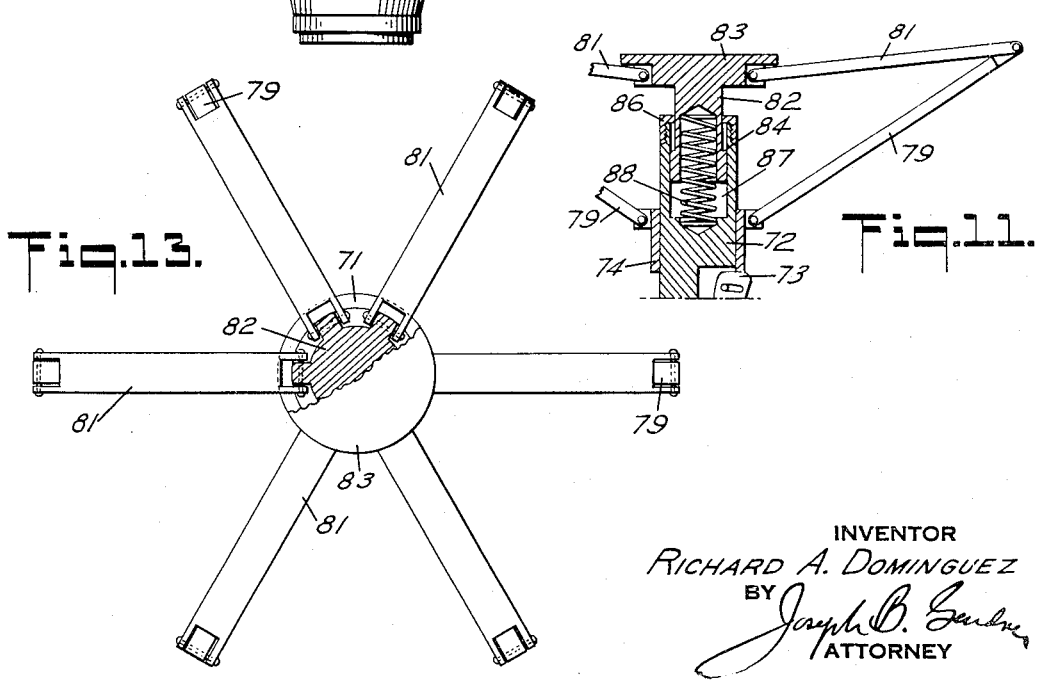

United States Patent Office 2,742,955
Patented Apr. 24, 1956

2,742,955

COLLAPSIBLE SEAT STRUCTURE

Richard A. Dominguez, Richmond, Calif.

Application January 13, 1951, Serial No. 205,854

3 Claims. (Cl. 155—135)

This invention relates to seating structures, and is particularly directed to portable seats which are capable of being folded into compact units when not in operative use.

An object of the present invention is to provide a structure which can be readily extended to provide a seating surface for the user, and which similarly may be readily folded or otherwise collapsed so as to permit the same to be inserted for carrying in a cane-like member.

A further object of my invention is to provide a structure of the type described in which the carrying member for the seat structure may be utilized as a support for the seat when the latter is in its operative position.

Another object of my invention is to provide a structure of the character referred to in which means are provided for positioning the seating surface at selective positions relative to the ground.

A still further object of this invention is to provide a light weight, easily constructed unit which possesses sufficient strength and is so built as to prevent accidental collapsing of the same when used as a seat, but which may be simply folded for storing or carrying as the user may desire.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by said drawings and description may be adopted within the scope of the invention as set forth in the claims.

Referring to the drawings:

Figure 1 is a perspective view of the collapsible seat, showing the same in operative position.

Figure 2 is an enlarged side elevational view of the structure shown in Figure 1, parts of the drawing being broken away in order to more clearly disclose the internal construction.

Figure 3 is a bottom plan cross-sectional view taken along the plane indicated by the lines 3—3 of Figure 2.

Figure 4 is an enlarged vertical side sectional view of the structure showing the seat portion in folded or inoperative position.

Figure 5 is a vertical side view of the structure with the seat portion folded into the support.

Figure 10 is a vertical side view, partly in section, of another modification, and indicating the seat portion in operational position.

Figure 11 is a portional elevational view, indicating the position of the parts when the seat is supporting the weight of an occupant.

Figure 12 is a vertical side view of the structure shown in Figure 10, but with the seat portion in its collapsed position.

Figure 13 is a top plan view of the structure shown in Figure 10.

Figure 6:
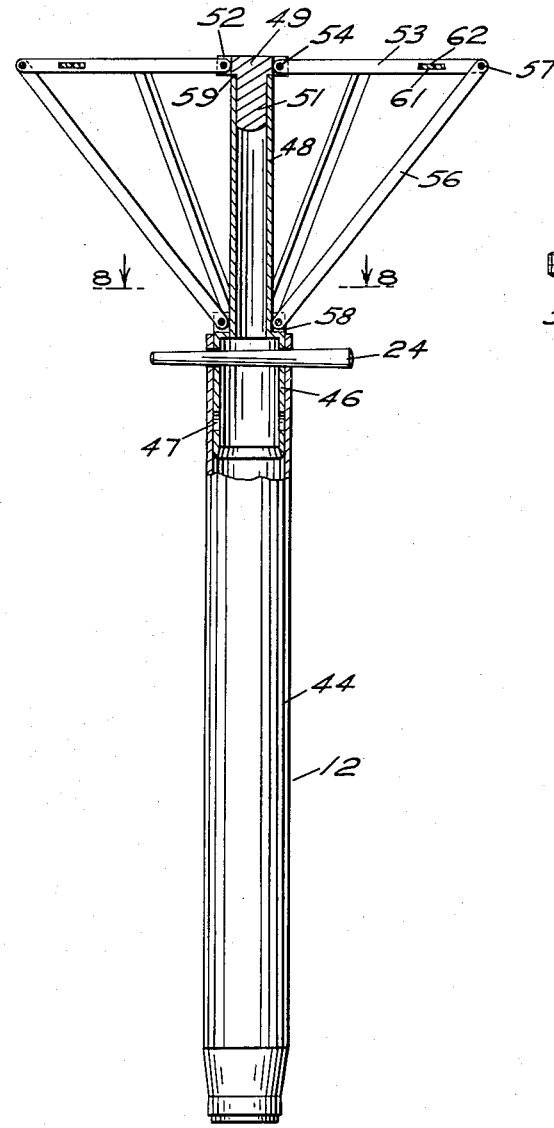
Figure 6 is a vertical side view, partly in section, of a modified form of the invention, and indicating the seat portion in operative position.
Figure 8:
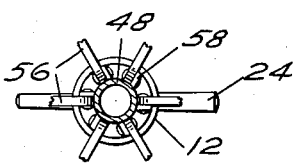
Figure 8 is a plan view taken along the plane indicated by the lines 8—8 of Figure 6.
Figure 7:
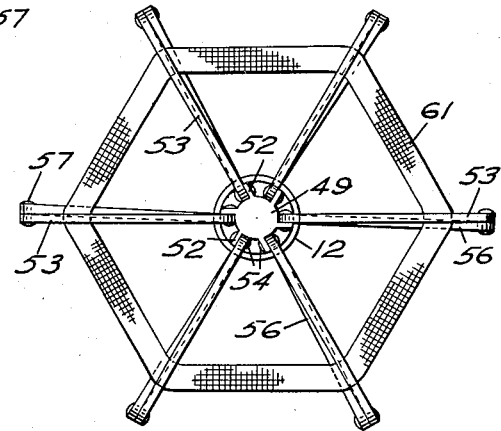
Figure 7 is a top plan view of the structure shown in Figure 6.

With particular reference to Figures 1 to 5 of the drawing, it will be seen that the structure of my invention includes a foldable seat portion generally denoted by the numeral 11, and a support member generally indicated by the numeral 12, the latter also serving as a casing for the seat portion when in its folded or collapsed position. As will be hereinafter described in detail, it will be apparent that the structure when in operative use comprises a single leg support and a seat having its general plane substantially normal to the axis of the support. When the seat is folded, it is capable of being entirely inserted in the support member for carrying as a walking or swagger stick, or for conservation of space in storing the complete unit. As here shown, the support member 12 comprises a tubular member 13 preferably constructed of a durable light weight metal such as aluminum, although it is apparent that other materials, including plastics, could be readily utilized. The bottom portion of member 13 may be tapered at 14 for the sake of appearance, and inserted in the lower end thereof is a plug member 16 provided with a rubber or other resilient base 17 so as to prevent sliding of the support member when in operative use.

Slidably supported by and extending into the upper end of the member 13 is a sleeve 18 provided with a radial shoulder 19 so as to limit the entrance of the sleeve into member 13. Sleeve 18 is provided with an axially extending threaded stud 21 for a purpose to be hereinafter described and is further provided with a plurality of pairs of apertures 22 corresponding to aligned apertures 23 on member 13. A tapered drift pin 24 is insertible through the apertures 23 and selected ones of the apertures 22 whereby the sleeve may not only be retained in its closure forming position as indicated in Figure 4, but also may be supported in an axially extended position in which the stud 21 is further removed from the support member base 17.

The seat portion 11 may assume a variety of forms, but must be capable of collapsing or being folded into such a compact shape that it may easily be inserted into the cylindrical chamber 26 defined by the member 13. One of such forms is best shown in Figures 3 and 4 of the drawings in which the seat portion 11 is shown as comprising a substantially heavy rectangular element 27 provided with a threaded aperture 28 so as to be engageable with the stud 21 for releasably securing the seat to the support member. Arm members 29 and 31 are pivotally secured at medial portions thereof by means of pins 32 or the like, to the distal ends of element 27, and it will be seen that preferably one of the arms, for example arm 31, is pivoted to the upper surface of element 27, while the other arm is pivoted to the lower surface thereof. Auxiliary arm members 33 and 34 pivotally interconnect adjacent ends of arms 29 and 31, such auxiliary arm members at one end thereof being disposed adjacent the upper surface of arm 29, and at the other ends thereof being disposed adjacent the lower surface of arm 31. To further reinforce the seat, braces 36 and 37 are pivotally secured to element 27 and to arms 33 and 34, one end of the brace 36 being disposed adjacent the lower surface of element 27 and the other end thereof being disposed adjacent the upper surface of auxiliary arm 34. The other brace 37 has the ends thereof disposed oppositely to that of brace 36 as will be clear from the drawings. All of the pivotal connections set forth above may simply comprise pins 32 such as those previously described.

From the foregoing description, it will be evident that the various metal strap members comprising seat portion 11 are so arranged that by pressing the corners 38 and 39 of the seat inwardly and toward each other, the members will assume the positions shown in Figure 4 so as to be readily insertible in tubular member 13. As it is desirable to have the members readily foldable, means are provided for preventing accidental folding when the seat portion is in operative use. Such means may comprise a link 41 pivoted at one end to the under surface of the juncture of arm 29 and element 27 and having the other end thereof provided with a hook 42 releasably engageable with a stud 43 extending downwardly from the juncture of auxiliary arm 34 and brace 36. In this manner, so long as the hook 42 is engaged with the stud 43, folding of the seat portion will be prevented, but upon pivoting of the link 41 to the left as viewed in Figure 3, the members may be readily put into their collapsed position by pressing inwardly at 38 and 39 as hereinbefore described.

When the seat portion 11 is in its folded or collapsed position, the medial portions thereof are in relative adjacency to the walls of chamber 26, but the upper portions are sufficiently spaced therefrom so as to permit sleeve 18 to enter the support member for a considerable portion of the length of the latter. In this manner, the elevation of the seat above the ground can be selectively varied from a distance corresponding to the height of member 13 to a distance equal to the combined length of member 13 and the distance from the top of sleeve 18 to its lowermost aperture 22.

Figure 9:
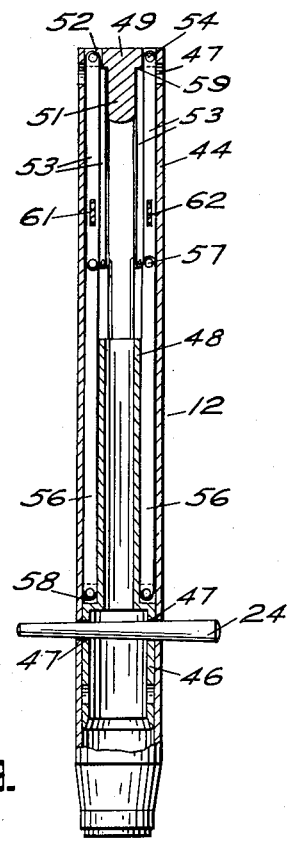
Figure 9 is a vertical side view of the structure shown in Figure 6, but with the seat portion in its collapsed position, portions of the view being broken away to show the inner parts of the structure.

In Figures 6 to 9 of the drawings, a modified form of my invention is disclosed in which the seat portion is substantially automatically opened in an umbrella-like fashion upon being raised from the support member 12. This is accomplished by utilizing a tubular support member 44 similar to member 13, in which a sleeve member 46 is axially slidable. Members 44 and 46 are provided with apertures for reception of pin 24 for retaining the two in inoperative position, as well as for maintaining the seat portion in elevated position as shown in Figure 6. Sleeve member 46 is substantially cylindrical in form and includes an axially aligned and diametrically reduced extension 48 which serves a function to be later described. When the seat is in folded or inoperative position as shown in Figure 9, a plug member 49 is insertible in the upper end of tube 44; the plug comprising a stem 51 of a diameter permitting the entry into sleeve extension 48 and a plurality of radially extending flanges 52 circumferentially spaced along the upper surface thereof, the peripheral edges of which just clear the inner surface of tube 44 to permit entry of the plug therein.

The seat portion preferably includes a plurality of arms 53 extending radially from plug 49 by means of pivot pins 54 connected to the flanges 52. To secure the seat to the support and permit its automatic folding and unfolding operation, I provide a plurality of links 56 each of which is pivotally connected at an end thereof to the distal ends of arms 53 by means of pins 57, and pivotally secured at the other end thereof to flanges 58 formed integrally with sleeve 46 at its juncture with extension 48.

From the foregoing, the operation of folding and unfolding this modified form of my invention is believed to be clear. To convert the unit to the operative position shown in Figure 6 from the collapsed position indicated in Figure 9, it is merely necessary to remove pin 24 which holds the entire assembly in place, raise the plug member 49 axially upwardly until the sleeve and its extension are in the position shown in Figure 6, insert the pin 24 in the selected apertures, and then lower the plug member into the upper end of extension 48, the shoulder 59 of the plug limiting its movement therein.

To fold the seat, it is necessary only to raise the plug member until the arms and links are substantially parallel, and then reverse the procedure outlined above.

If desired, to make the seat more comfortable for use, one or more bands 61 of fabrics or the like may be secured to arms 53 in any suitable manner, such as by providing slots 62 through which the fabric is extended.

Referring now to Figures 10–13 of the drawings, a still further and simpler modification of my invention is disclosed. In this embodiment, the pins 24 have been eliminated, and means are provided for resiliently supporting the weight of the user. As here shown, the structure comprises a tubular member 71 and an insert sleeve element 72, the latter being provided with a spring loaded detent 73 normally urged radially outwardly and arranged to engage the lower surface of a collar 74 axially slidable in sleeve 72 when the collar is in extended or seat supporting position. The sleeve is releasably secured relative to the member 71 in either the collapsed position indicated in Figure 12 or extended as seen in Figure 10 of the drawing. The means for thus securing the parts includes a longitudinally extending notch 76 in member 71 in which is engaged a stud 77 of sleeve member 72. By providing a transverse distal portion 78 on the notch, it will be evident that by moving the sleeve and its associated stud to its limits of travel, and rotating the same, axial movement will be simply and effectively prevented.

Here, too, the seat portion includes a plurality of links 79 pivotally mounted on collar 74, and the arms 81 are pivotally secured adjacent their outer ends to such links, the inner ends thereof being pivotally secured to a plug member 82. Member 82 is provided with a substantially flat top 83 forming a closure for member 71 when the seat is inserted therein, and adjacent its lower end has a shoulder 84 arranged to be normally contacted by a flange 86 at the top of a bore 87 provided at the upper end of sleeve 72. A spring 88 is interposed in the bore between sleeve 72 and member 82 and normally urges the latter upwardly until shoulder 84 engages the sleeve flange. In this manner, when a person sits in the seat, there will be a resilient effect and produce a more comfortable seat. Obviously, the spring could be disposed elsewhere on the structure, for example, adjacent the base 89 on member 71, so long as the cushioning effect will be preserved.

To open the unit from its collapsed and stowed position, it is merely necessary to rotate the member 83 until the stud 77 is aligned with the vertical portion of notch 76. The plug and sleeve may then be withdrawn to their full extent until the detent 73 engages collar 74 to hold the latter in axial position. By rotating the sleeve, the stud 77 will enter the upper transverse notch 78 and prevent the sleeve and seat portion from downward movement. To replace the seat in the tubular carrying member, it is only required that detent 73 be pushed inwardly, so as to permit collar 74 to drop down on sleeve 72. This, of course, will cause arms 81 and links 79 to be placed in longitudinal alignment adjacent the sleeve periphery so as to drop into member 71.

In all of the embodiments illustrated and described herein, it will be seen that an extremely simple seating device has been provided which may be readily opened for use or closed for carrying purposes. It is apparent that these structures are not intended to take the place of regular chairs, but are believed to have particular utility among hikers, campers, or spectators at such sports as horse racing where no adequate seating provisions are generally made.

I claim:

1. A portable seat structure comprising a generally tubular member defining a substantially cylindrical chamber, a sleeve member telescopically mounted in said tubular member and movable from a position substantially entirely within said chamber to positions axially extending therefrom, means on said sleeve member engageable with portions of said tubular member in certain positions of rotation of the sleeve for preventing axial movement therebetween, a seat portion attached to said sleeve member, a plug member axially slidable in said sleeve member and attached to said portion, and resilient means interposed between said plug and sleeve members.

2. A device of the character described comprising a tubular member having an open top and a longitudinally extending slot having transverse portions adjacent the ends thereof, a sleeve member axially slidable in said tubular member and having a protuberance on the periphery thereof engageable with and movable in said slot, a collar axially slidable on said sleeve, means on said sleeve for holding said collar in fixed position thereon, a plug member mounted for axial sliding movement in said sleeve, means limiting withdrawal of the plug member from the sleeve, a spring interposed between said plug member and said sleeve, a plurality of arms pivotally attached at their inner ends to said plug member, a plurality of supporting links pivotally attached at their inner ends to said collar member, means pivotally connecting the outer ends of said arms with respective outer ends of said links whereby when said collar is in its lowermost position on said sleeve the links and arms will be placed in longitudinally extending position and when said collar is in its uppermost position said arms will extend substantially laterally from said sleeve member.

3. A portable seating structure comprising a tubular member defining a chamber, a seat structure comprising a central element and a plurality of radially extending arm members pivotally attached thereto whereby said members may be selectively extended to all lie in a general plane and folded into substantial adjacency with each other, said seat structure in said folded position being of a size permitting the complete entry thereof into said chamber, a sleeve member slidably mounted in said chamber, prop members pivotally mounted relative to said sleeve member and pivotally secured to the distal ends of said arm members, means for securing said sleeve member relative to said tubular member in selected positions of axial relationship, and means for operatively attaching said seat structure to said sleeve member while permitting relative axial movement therebetween, said last named means including a generally cylindrical member in engagement adjacent its upper end with said central element of said seat structure and other portions thereof being in slidable engagement with said sleeve member.

References Cited in the file of this patent

UNITED STATES PATENTS

| | | |
|---|---|---|
| 389,810 | Hendrickson | Sept. 18, 1888 |
| 494,303 | Nixon | Mar. 28, 1893 |
| 636,074 | Skoog | Oct. 31, 1899 |
| 1,111,586 | Hurlbert | Sept. 22, 1914 |
| 1,185,642 | Emerson | June 5, 1916 |
| 1,449,023 | Wardle | Mar. 20, 1923 |
| 2,560,079 | Blum | July 10, 1951 |

FOREIGN PATENTS

| | | |
|---|---|---|
| 16,167 | Great Britain | July 21, 1904 |
| 16,334 | Great Britain | July 19, 1906 |